United States Patent [19]

Czajkowski

[11] Patent Number: 4,513,989
[45] Date of Patent: Apr. 30, 1985

[54] GOLF CART

[76] Inventor: Norman Czajkowski, 8815 Walnut Hill Rd., Chevy Chase, Md. 20015

[21] Appl. No.: 26,166

[22] Filed: Apr. 2, 1979

[51] Int. Cl.³ ............................................... B62B 1/12
[52] U.S. Cl. ...................................... 280/645; 280/42; 280/47.24; 280/652
[58] Field of Search ........... 280/646, 42, 652, DIG. 6, 280/655, 645, 47.19, 47.26

[56] References Cited

U.S. PATENT DOCUMENTS

| | | | |
|---|---|---|---|
| 2,326,482 | 8/1943 | Moffitt | 280/47.26 X |
| 2,383,587 | 8/1945 | Boughton | 280/47.26 |
| 2,577,290 | 12/1951 | Underwood | 280/646 |
| 2,626,814 | 1/1953 | Chamberlin | 280/42 |
| 2,628,801 | 2/1953 | Gunning | 280/DIG. 6 |
| 2,714,012 | 7/1955 | Berger | 280/DIG. 6 |
| 2,772,890 | 12/1956 | Gastright | 280/47.26 X |
| 3,079,166 | 2/1963 | Abgarian | 280/DIG. 6 |
| 3,389,818 | 6/1968 | Rinehart | 280/47.26 X |

FOREIGN PATENT DOCUMENTS 1376435  12/1974  United Kingdom ............... 280/652

Primary Examiner—Joseph F. Peters, Jr.
Attorney, Agent, or Firm—Cushman, Darby & Cushman

[57] ABSTRACT

A cart for mounting a golf bag for utilizing the inherent structural rigidity of the bag to effect mounting, and providing a simplified arrangement for collapsing the cart wheels for ready transport of the cart and bag. A pair of wheels are mounted to a frame mechanism, and the frame mechanism is mounted to the bag at its handle, an insert being provided in the handle with a through-extending pivot pin which is received by clamps mounted to the frame mechanism. A handle is mounted to a second frame mechanism which in turn is rigidly attached to the bag between the bag handle and the bag opening. The frame mechanism is only pivotally movable with respect to the second frame mechanism about the pivot pin at the bag handle, and upon rotation of the handle with respect to the second frame mechanism such relative movement is effected. Additionally, a pair of cables operatively connected to the wheels and to the second frame mechanism is provided for effecting movement of the wheels toward and away from each other along their common axis in response to rotational movement of the handle.

27 Claims, 8 Drawing Figures

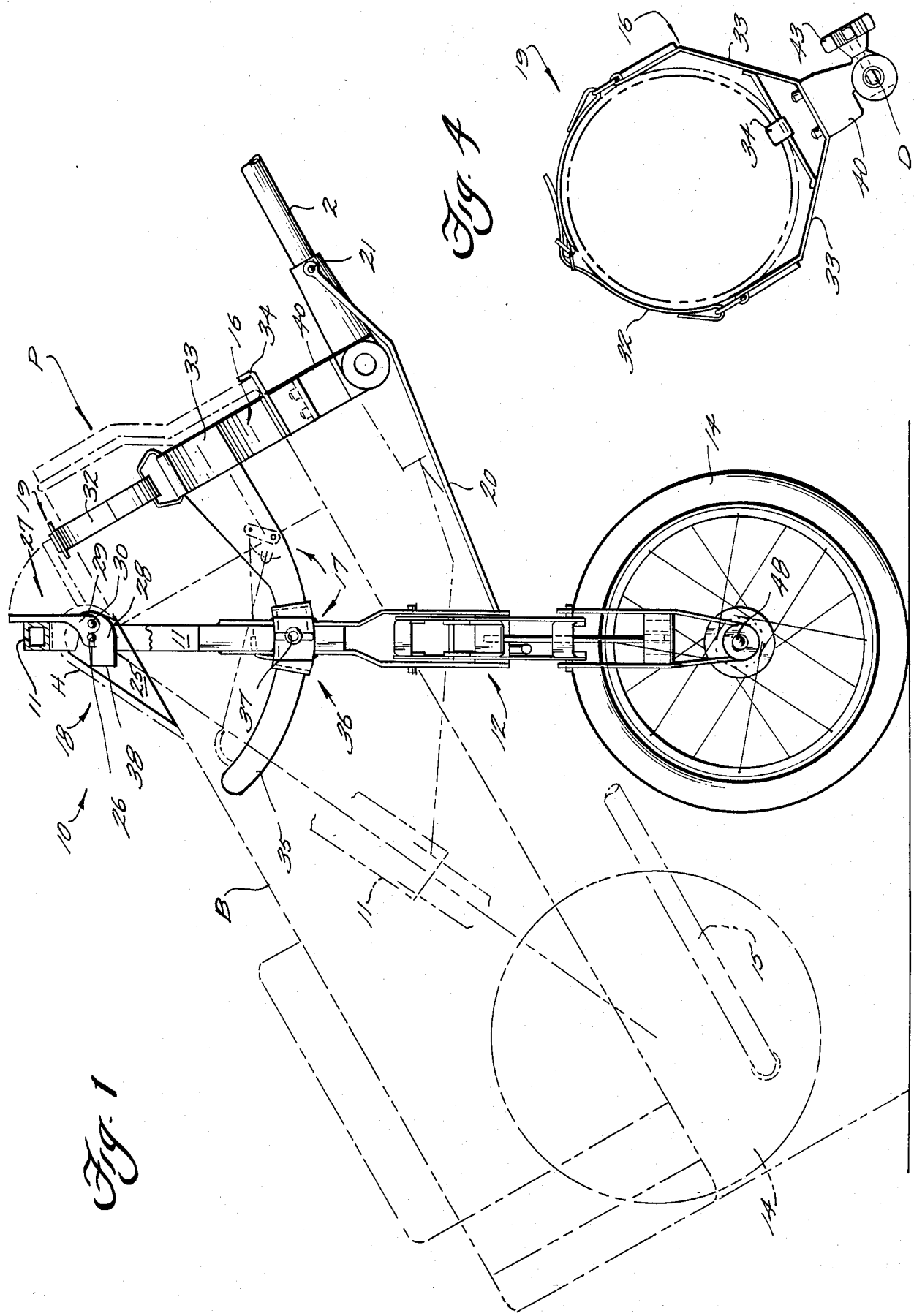

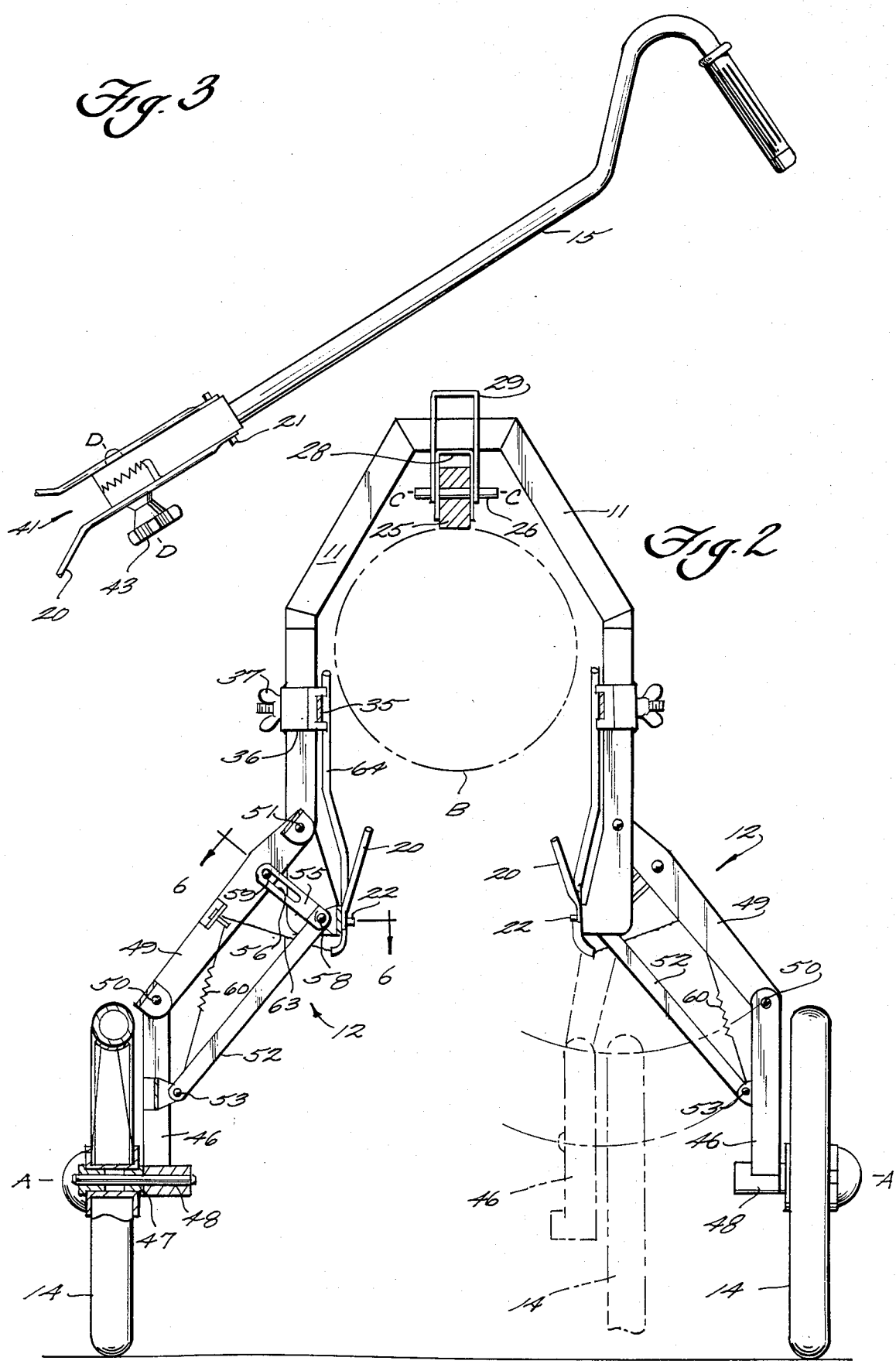

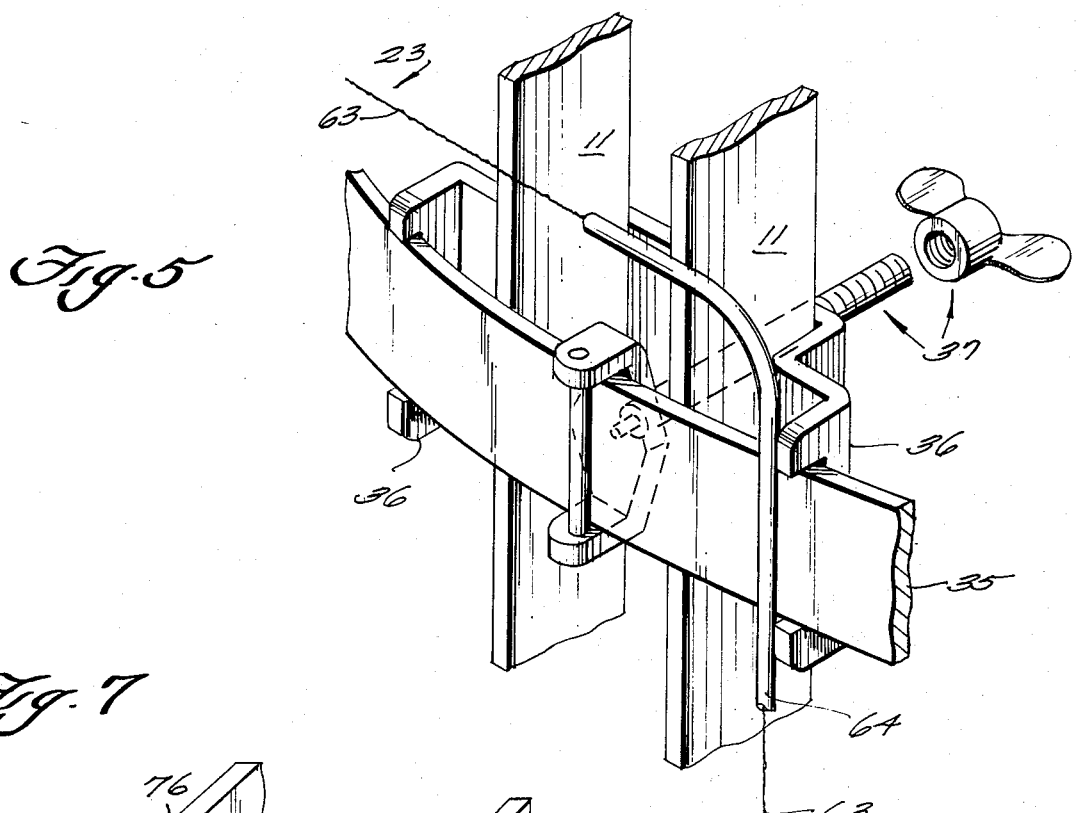
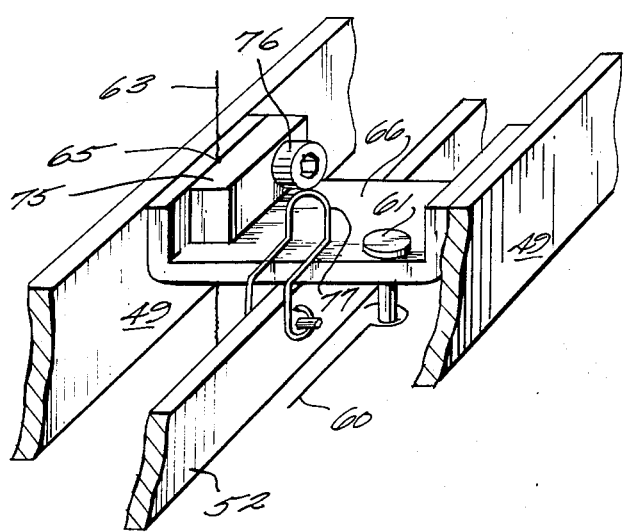
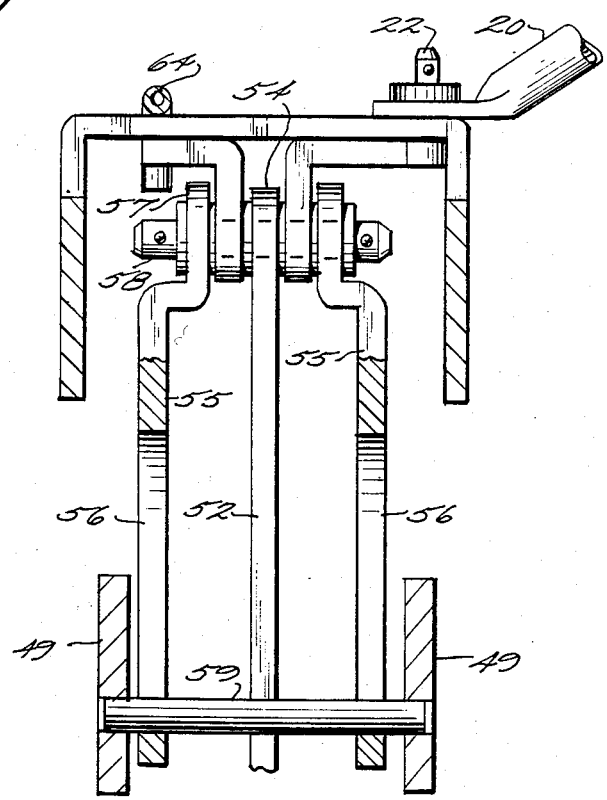

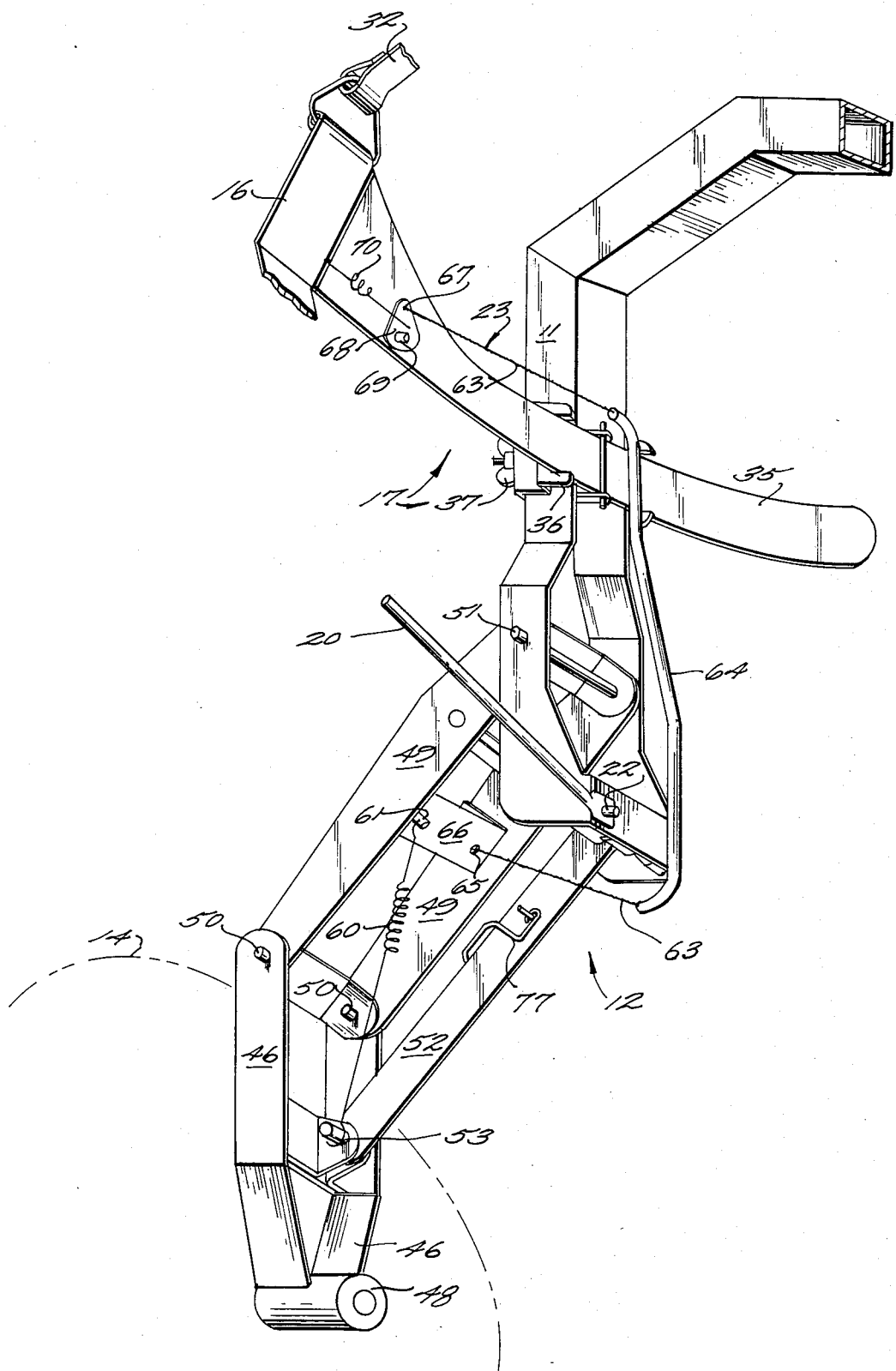

GOLF CART

BACKGROUND AND SUMMARY OF THE INVENTION

Conventional hand-pull golf carts, such as shown in U.S. Pat. No. 3,079,166, are useful for supporting a golf bag for ready movement over a golf course, while still providing for ready transport of the bag by collapsing the cart While conventional golf carts are useful, they normally contain accessory frame components, mounting the golf bag at both ends thereof despite the inherent structural rigidity of the golf bag and mounting the bag in such a way that access to all pockets in the bag is precluded by frame components. Additionally, conventional carts are sometimes not properly balanced, and the supporting and collapsing mechanisms are unnecessarily heavy.

There have been proposals in the patented literature for eliminating some of the cart supporting components by taking advantage of the inherent structural rigidity of the bag, such as shown in U.S. Pat. No. 2,628,801. However, such prior proposals have not been especially commercially successful, probably at least in part due to the inability to readily collapse the cart, the difficulty in attaching and removing the bag to and from the cart, and inability to properly position the pull-handle with respect to the bag to provide a minimum of pulling effort.

According to the present invention, a manual golf cart is provided having numerous advantages over conventional golf carts. A golf cart according to the present invention has a weight reduction of about 30 to 40% with respect to conventional carts due to elimination of some frame components and reliance on the bag's inherent structural rigidity, and due to a simplified folding mechanism; free access is provided to all the pouches of the bag; the bag is mounted at its handle so that the balance essential for easy pulling is automatically achieved; and the cart handle may be readily moved to any desired position for ease of pulling.

According to the present invention, a cart for mounting an elongated structurally rigid bag (having an opening at one end thereof, and a handle at one side thereof adjacent the opening) is provided, the cart comprising a frame mechanism, means for attaching a pair of wheels to the frame mechanism, and means for mounting the frame mechanism to the bag by its handle, and for providing pivotal movement of the frame mechanism with respect to the bag mounted thereby. The mounting means consists essentially of structures engaging the bag disposed only between the bag handle and the opening, and preferably includes an insert having substantially the same exterior configuration as the interior configuration of the bag handle and having a pivot pin extending outwardly from the sides thereof for receipt by releasable clamping means mounted to the frame mechanism. The cart also includes a second frame mechanism which is rigidly attached to the bag between its handle and the bag opening, and means are provided for mounting the second frame mechanism for only pivotal movement about said pivot pin with respect to the first frame mechanism. A handle means is provided mounted for pivotal movement with respect to said second frame mechanism about an axis substantially parallel to said pivot pin, and the handle means is interconnected to the frame mechanism and to the wheels to effect pivotal movement of the frame mechanism about said pivot point with respect to said second frame mechanism, and to effect movement of said wheels toward and away from each other along a common axis of rotation.

Cable means are provided for operatively connecting the wheels to the handle means for effecting relative movement of the wheels toward and away from each other in response to movement of the handle means, and a latching mechanism may be provided to latch the wheels in a position adjacent each other so that they remain adjacent to each other despite relative movement of the frame mechanism with respect to the second frame mechanism in response to relative movement of the handle with respect thereto. The frame mechanism preferably comprises a metal yoke formed of tubing having a polygonal cross-sectional shape, and arcuate guide bars are attached to the second frame mechanism and are received by guide ways on the first frame mechanism for allowing relative guided movement therebetween.

It is the primary object of the present invention to provide an improved manual golf cart. This and other objects of the invention will become clear from an inspection of the detailed description of the invention, and from the appended claims.

BRIEF DESCRIPTION OF THE DRAWINGS

FIG. 1 is a side view showing in solid line an exemplary golf cart according to the present invention in extended position, with the nearest wheel removed for clarity, and illustrating in dotted line the cart in collapsed position;

FIG. 2 is an end view, with some parts shown in cross-section, of the cart of FIG. 1 looking in at the end thereof opposite the handle, and showing the cart in extended position in solid line, and in collapsed position in dotted line;

FIG. 3 is a bottom plan view of the handle of the cart of FIG. 1 and the interconnection between the handle and a second frame mechanism;

FIG. 4 is a detailed end view of the mechanism for attaching a golf bag to the second frame mechanism of the cart of FIG. 1;

FIG. 5 is a detailed view of a guide way attached to the frame mechanism of the cart of FIG. 1, and receiving an arcuate guide bar;

FIG. 6 is a detailed view, partly in cross-section and partly in elevation, of the interconnection between components of the linkage for connecting the wheels to the frame mechanism;

FIG. 7 is a detailed view of the attachment of the cable means to the wheel linkage mechanism and the latching means for latching the wheels in an adjacent relative position; and FIG. 8 is a perspective view showing the wheel linkage mechanism in detail, and the interconnection between the cable means, wheel linkage mechanism, and second frame means.

DETAILED DESCRIPTION OF THE DRAWINGS

A cart according to the present invention is shown generally at 10 in the drawing, the cart being adapted to mount an elongated structurally rigid bag, such as a golf bag B having an opening P at one end thereof for receipt of golf clubs and the like, and having a handle H at one side thereof adjacent opening P (see FIG. 1). The cart comprises a frame mechanism 11—which preferably comprises a metal yoke formed of tubing having a polygonal (e.g., square) cross-section—with parallelogram linkage mechanisms 12 (see FIGS. 2 and 8 in particular) for attaching a pair of wheels 14 to the frame mechanism 11 so that the wheels have a common axis of rotation A—A, and are movable with respect to each other along the axis A—A (as indicated in dotted line in FIG. 2).

The cart 10 further includes a handle means 15 which is pivotal about axis D—D (see FIG. 3) parallel to the axis A—A with respect to a second frame mechanism 16. Mounting means 17 are provided for mounting the frame mechanism 11 for relative movement with respect to the second frame mechanism 16 about an axis C—C (see FIG. 2) which is parallel to the axes A—A and D—D.

The frame mechanisms 11, 16 are mounted to the bag B in order to take advantage of the inherent structural rigidity of the bag B. Means 18 are provided for mounting the frame mechanism 11 to the bag B at its handle H, pivotal movement of the frame mechanism 11 with respect to the bag B mounted thereby being provided by the handle mounting means 18. Mounting means 19 are also provided (see FIGS. 1 and 4 in particular) for rigidly mounting the bag B to the second frame mechanism 16.

The handle means 15 is operatively mounted to the wheel attaching means 12 and to the frame mechanism 11 so that upon rotation of the handle 15 about axis D—D with respect to the second frame mechanism 16, the wheels 14 move toward and away from the bag B mounted by the cart (see dotted line position in FIG. 1), and the wheels 14 move toward and away from each other along the common axis A—A (see dotted line position in FIG. 2). Such mounting is accomplished by connecting rods 20 pivotally mounted at one end 21 thereof to the handle means 15, and at the other end 22 thereof (see FIG. 2) to the frame mechanism 11, and by cable means 23 (see FIGS. 2, 5 and 8 in particular) connected between the second frame mechanism 16 and the wheel linkage 12.

The mounting means 18 preferably comprises an insert 25 having substantially the same exterior configuration as the interior configuration of the bag handle H and having a pivot pin 26 extending outwardly from the sides thereof and establishing the axis C—C (see FIG. 2). Releasable clamping means 27 are mounted on the frame mechanism 11 for receipt of the pivot pin 26, the means 27 including a stationary portion, two-prong hook 28, abutting one side of the pivot pin 26—on opposite sides of the insert 27—and a movable clamping portion 29 pivotal about pivot axis 30 with respect to the stationary portion 28 to engulf or release the pivot pin 26. The clamp member 29 is shown in clamping position in solid line in FIG. 1, and in releasing position in dotted line in FIG. 1.

The bag attaching means 19 includes a conventional brace strap 32 which extends from each of the arms 33 of the second frame mechanism 16, and a bag clip 34 which abuts the end of the bag B at the opening P.

The means 17 for allowing relative pivotal movement of the frame mechanism 11 with respect to the second frame mechanism 16 preferably includes a pair of arcuate guide arms 35 rigidly attached to the arms 33 of the second frame mechanism 16 and received by respective guide ways 36 (see FIGS. 1, 5 and 8 in particular) mounted on the frame member 11. A guide bar clamp 37 is provided for clamping the guide bar 35 to the guide way 36 at any relative position to which they have been moved, while being releasable to allow free relative movement therebetween.

The handle means 15 preferably is connected to the second frame mechanism 16 by a bracket 40 or the like, and can be locked in any relative rotational position to which it has been moved with respect to the second frame mechanism 16 by the groove surfaces 41 (see FIG. 3), which are selectively released or engaged by rotation of the knobbed nut 43. The handle means 15 can be rotated all the way from the solid line position in FIG. 1 to the dotted line position therein.

The wheel linkage 12 preferably comprises a parallelogram linkage associated with each wheel 14, each parallelogram linkage including a wheel bracket 46 which provides a wheel bearing 47 for receipt of a wheel axle 48. An upper link 49 is pivotally connected at one end 50 thereof to the wheel bracket 46, and at the other end 51 thereof to the frame mechanism 11. A lower link 52 is operatively pivotally connected at one end 53 thereof to the wheel bracket 46, and at the other end 54 thereof to the frame mechanism 11. A restraining link 55 having an elongated slot 56 therein is operatively pivotally mounted to the frame mechanism 11 at one end 57 thereof (see FIG. 6), preferably by the same pivot pin 58 mounting the end 54 of the lower link 52. FIG. 6 illustrates such an arrangement taken along lines 6—6 of FIG. 2. The slot 56 of the restraining link 55 receives a restraining link pin 59 mounted on the upper link 49. As illustrated in the drawings, the links 49 and 55 are preferably bifurcated. Additionally, spring means 60 (see FIGS. 2 and 8) are provided operatively attached between wheel bracket 46 (for instance at pivot point 53) and upper link 49 (for instance at wheel extension spring anchor 61) to provide a biasing force that normally biases the linkage mechanism 12 to the position illustrated in solid line in FIG. 2, wherein the wheels 14 are spaced a maximum distance from each other along the axis A—A.

The cable means 23 effect movement of the wheels 14 toward each other along the axis A—A in response to relative movement between the second frame mechanism 16 and the frame mechanism 11. As illustrated most clearly in FIGS. 7 and 8, the cable means 23 includes a cable 63 which passes through a stationary guide tube 64 that is rigidly attached to the frame mechanism 11, and is attached at a first end 65 thereof to an upper link support bar 66. At the other end 67 thereof, the cable 63 is connected to a cable lever 68 at a point offset from a pivot pin 69 about which the lever 68 rotates. The lever 68 is biased about the pivot pin 69 by spring means 70 in one sense, the cable 63 tending to rotate the lever 68 about the pivot pin 69 in the opposite sense. The lever 68 and spring means 70 are operatively mounted on the guide bar 35, or other structure rigidly connected to the second frame mechanism 16.

At its end 65, the cable 63 is preferably connected to the support bar 66 by a mechanism allowing ready adjustment of the effective link thereof. Such a mechanism may include a cable clamp 75 which may be selectively moved into clamping or releasing engagement with respect to the cable 63 by rotation of the socket head screw 76 (see FIG. 7).

While normally the wheels 14 will be moved toward and away from each other along axis A—A by movement of the handle means 15 about axis D—D at the same time that the frame mechanism 11 is moved with respect to the second frame mechanism 16, if desired according to the present invention, the wheels 14 may be latched in their adjacent-most position (for ease of maneuverability through small passageways and the like) while still not effecting the movement of the wheels 14 toward and away from the bag B. This is accomplished utilizing the wheel lock 77 (see FIGS. 7 and 8) associated with each wheel linkage 12. When moved to the position indicated in FIG. 7, engaging the member 66, the wheel locking mechanism 77 prevents rotation of the linkage components about the pivot pins 50, 51, 53, and 54, thus preventing movement thereof from the dotted line position in FIG. 2 to the solid line position in FIG. 2.

The cart according to the present invention preferably utilizes weldable high strength aluminum alloys as the principle materials of construction of the structural members, and preferably bearings are provided at the pivot points (and for the wheel bearing 47) that have low friction and long life, such as flanged sleeve bearings made of oil impregnated bronze or of low friction plastic. While the cart is primarily designed to integrate the cart structure with that of existing bags, by modifying the design of the bag B while retaining its conventional usage, it is possible to increase the integration of structure of the cart and the bag, and reduce the weight of the cart even further. For example, the rigidity of the upper collar of the bag B could be increased so that the cart handle bracket 40 could be attached directed thereto, and the bag B could be provided with snaps so that the bag could be fastened to the yoke 11 when the cart was in the unfolded position. Such elements of bag redesign would essentially perform the same function as the second frame mechanism 16 of which the guide bars 35 and guide ways 36 are a part, thus resulting in a significant decrease in cart weight.

The basic components of an exemplary structure according to the present invention having been described, an exemplary mode of operation will now be set forth:

The golfer attaches the bag B to the cart 10 by first placing handle insert 25 in the bag handle. To facilitate hanging of the pivot pin 26 of the insert 25 on the clamping mechanism 27, the golfer desirably places the cart in a stable position by rotating the handle 15 into a position midway between the dotted and full line positions illustrated in FIG. 1, and then locking the handle in that position by tightening the knob 43. The cart then has a stable configuration like that of a tripod with the handle acting as the third leg. With the cart in this configuration, the pivot pin 26 is then inserted into the two-pronged hooked portion 28, and the clamp 29 pivoted about pin 30 from the dotted line position in FIG. 1 to the solid line position therein, thereby mounting the bag B to the frame mechanism 11, while allowing pivotal movement of the frame mechanism 11 about the pivot point 26 with respect to the bag B. The strap 32 is then wrapped around the bag and tightened.

With the bag mounted on the cart, to unfold the cart for use the golfer then releases the knob 43 and rotates the handle 15 to the solid line position of FIG. 1. Rotation of the handle about axis D—D to that position results in the connecting rods 20 pulling the frame mechanism 11 along the guide bars 35 with respect to the second frame mechanism 16 from the position illustrated in dotted line in FIG. 1 to the solid line position, and at the same time the effective length of the cable 63 from end 65 to the guide tubes 64 is increased, allowing the wheels 14 to move from the dotted line configuration in FIG. 2 to the solid line configuration therein under the bias of spring means 60. At this position, the handle 15 is locked in place by rotation of the knob 43, and the frame mechanism 11 is locked with respect to the guide bars 35 by the guide bar clamp 37. Because of the design of the connecting rods 20 and other components, the height of the handle mechanism may be readily adjusted to any desired position with little effect on cart balance since the crank mechanism (handle 15, yoke 11, and connecting rods 20) is at or near the end of its stroke.

If it is desired that the wheels 14 be retained close to each other while the cart is unfolded, as where the cart will be pulled through narrow passageways, this may be accomplished by rotating the wheel locks 77 to the position indicated in FIG. 7 whereby the linkages 12 will not be able to be deployed from the dotted line position in FIG. 2 to the solid line position.

Adjustment of the effective length of the cable 63 is effected by loosening clamp 75 and pulling on the cable 63 at the end exiting the clamp 75 with sufficient force to fold the wheel linkage, then tightening the clamp 75 as the pull force is maintained.

When it is desired to fold the cart up for ease of transport, the golfer merely loosens the clamp 37, loosens the knob 43, and pivots the handle 15 from the solid line position in FIG. 1 to the dotted line position therein. In so doing, the frame mechanism 11 is moved along guide bars 35 away from the second frame member 16 so that the wheels 14 move closer to the bag B (from the solid line to the dotted line configuration in FIG. 1), and at the same time (see FIG. 8) the effective length of each cable 63 from the guide 64 to the end 65 is decreased, whereby the links 55, 49, and 52 are rotated about their pivot points against the bias of spring 60 from the solid line configuration of FIG. 2 to the dotted line configuration thereof.

While the invention has been herein shown and described in what is presently conceived to be the most practical and preferred embodiment thereof, it will be apparent to those of ordinary skilled in the art that many modifications may be made thereof within the scope of the invention, which scope is to be accorded the broadest interpretation of the appended claims so as to encompass all equivalent structures and devices.

What is claimed is:

1. A cart for mounting an elongated bag, said cart comprising:

a frame mechanism;

means for operatively attaching said frame mechanism to a bag;

means for attaching a pair of wheels to said frame mechanism so that said wheels have a common axis of rotation and so that said wheels are movable with respect to each other along said common axis comprising a parallelogram linkage including a restraining link having an elongated slot formed therein and a pin attached to another link of said linkage received by said slot, and spring means for biasing said linkage so that said wheels are normally located a maximum distance apart along said common axis;

handle means;

means for operatively mounting said handle means to said frame mechanism so that said handle means are releasably movable with respect to said frame mechanism; and cable means operatively connecting said wheels to said handle means for effecting relative movement of said wheels toward and away from each other in response to movement of said handle means with respect to said frame mechanism.

2. A cart for mounting an elongated structurally rigid bag having an opening at one end thereof, and a single handle at one side thereof adjacent the opening, said cart comprising a frame mechanism;

means for attaching a pair of wheels, rotatable about a common axis, to said frame mechanism; and means for mounting said frame mechanism to a bag by its single handle so that the bag handle is on the opposite side of the bag as said wheels; and for providing pivotal movement of said frame mechanism with respect to the bag mounted thereby about an axis parallel to said wheels common axis and extending through the bag handle, said mounting means consisting of structures engaging said bag disposed only between the bag handle and the opening, and said mounting means comprising an insert having substantially the same exterior configuration as the interior configuration of the bag handle and having a pivot pin extending outwardly from the sides thereof, and releasable clamping means mounted to said frame mechanism for engaging said pivot pin to fix the position of said insert with respect to said frame mechanism while allowing relative pivotal movement therebetween.

3. A cart for mounting an elongated structurally rigid bag having an opening at one end thereof, and a single handle at one side thereof adjacent the opening, said cart comprising a frame mechanism;

means for attaching a pair of wheels to said frame mechanism; and means for mounting said frame mechanism to a bag by its single handle, and for providing pivotal movement of said frame mechanism with respect to the bag mounted thereby; said mounting means comprising an insert having substantially the same exterior configuration as the interior configuration of the bag handle and having a pivot pin extending outwardly from the sides thereof, and releasable clamping means mounted to said frame mechanism for engaging said pivot pin to fix the position of said insert with respect to said frame mechanism while allowing relative pivotal movement therebetween.

4. A cart as recited in claim 3 further comprising a second frame mechanism; means for mounting said frame mechanism for only pivotal movement, about said pivot pin with respect to said second frame mechanism; and wherein said means for mounting said frame mechanism to a bag comprises releasable means disposed between said insert and the bag opening for rigidly attaching said second frame mechanism to the bag.

5. A cart as recited in claim 3 wherein said clamping means comprises a stationary portion abutting one side of said pivot pin, and a movable portion mounted for pivotal movement, about an axis parallel to said pivot pin, with respect to said stationary portion to engulf or release said pivot pin.

6. A cart as recited in claim 4 further comprising a handle mounted to said second frame mechanism for pivotal movement with respect thereto about an axis substantially parallel to said pivot pin, and further comprising means interconnecting said handle and said frame mechanism for effecting pivotal movement of said first frame mechanism with respect to said second frame mechanism in response to pivotal movement of said handle about its axis.

7. A cart as recited in claims 4 or 6 wherein said means for mounting said frame mechanism for movement with respect to said second frame mechanism comprises a pair of arcuate guide bars and a pair of guide bar ways mounted on said frame mechanism for receiving said guide bars.

8. A cart as recited in claim 6 further comprising means for mounting said wheels for relative movement toward and away from each other, and cable means operatively connecting said wheels to said second frame mechanism so that relative movement of said wheels toward and away from each other is effected in response to rotation of said handle about its axis.

9. A cart for mounting an elongated bag, said cart comprising:

a frame mechanism comprising a yoke of metal tubing and having a polygonal cross-sectional shape;

means for operatively attaching said frame mechanism to a bag;

means for attaching a pair of wheels to said frame mechanism so that said wheels have a common axis of rotation and so that said wheels are movable with respect to each other along said common axis;

handle means;

means for operatively mounting said handle means to said frame mechanism so that said handle means are releasably movable with respect to said frame mechanism; and cable means operatively connecting said wheels to said handle means for effecting relative movement of said wheels toward and away from each other in response to movement of said handle means with respect to said frame mechanism.

10. A cart for mounting an elongated bag, said cart comprising a frame mechanism; means for operatively attaching said frame mechanism to a bag; means for attaching a pair of wheels to said frame mechanism so that said wheels have a common axis of rotation and so that said wheels are movable with respect to each other along said common axis; handle means; and means for operatively connecting said handle means to said frame mechanism so that upon relative movement therebetween said wheels are moved toward and away from each other along said common axis; wherein the improvement comprises said means for attaching said wheels to said frame mechanism comprises a pair of parallelogram linkages, one attaching each wheel to said frame mechanism;

each said parallelogram linkages comprising a wheel bracket having a bearing therein for allowing rotation of the wheel associated therewith with respect thereto; an upper link pivotedly connected at one end thereof to said bracket and at the other end thereof to said frame mechanism; a lower link operatively pivotedly connected at one end thereof to said bracket and at the other end thereof to said frame mechanism; and a restraining link operatively pivotedly connected at one end thereof to said lower link and having an elongated slot formed therein for receipt of a restraining link pin disposed on said upper link.

11. A cart as recited in claim 10 further comprising spring means extending between said upper link and said wheel bracket for biasing said linkage so that said wheels normally take a position a maximum distance apart from each other along said common axis.

12. A cart as recited in claim 10 wherein said frame mechanism comprises a yoke adapted to encircle a bag supported thereby.

13. A cart for mounting a golf bag, and comprising a frame mechanism; means for attaching a golf bag to the frame mechanism; means for mounting a pair of wheels which are rotatable about a common axis to said frame mechanism for movement toward and away from each other along said common axis and toward and away from a bag mounted by said frame mechanism; handle means operatively mounted to said frame mechanism and to said wheels for relative movement with respect thereto so that upon relative movement of said handle means with respect to said frame mechanism and said wheels said wheels are moved toward and away from each other along said common axis, and said wheels are moved toward and away from a bag supported by said frame mechanism; wherein the improvement comprises
means for selectively operatively latching said wheels in a position adjacent each other along said common axis so that relative movement of said handle means with respect to said frame mechanism and said wheels results in movement of said wheels toward and away from said bag, but does not result in movement of said wheels toward and away from each other along said common axis.

14. In combination, an elongated structurally rigid bag having an opening at one end thereof, and a handle at one side thereof adjacent the opening; and a cart; said cart comprising
a frame mechanism;
means for attaching a pair of wheels to said frame mechanism;
means for attaching said frame mechanism to said bag handle so that said handle is on the opposite side of said bag from said wheels;
a second frame mechanism having a handle operatively connected thereto; and
means for mounting said second frame mechanism rigidly to said bag adjacent said bag opening;
wherein said means for attaching said bag to said frame mechanism comprises an insert having substantially the same exterior configuration as the interior configuration of said bag handle, and having projections extending from either side thereof for receipt by clamping means mounted to said frame mechanism.

15. A cart for mounting an elongated bag, said cart comprising
a frame mechanism;
means for operatively attaching said frame mechanism to a bag;
means for attaching a pair of wheels to said frame mechanism so that said wheels have a common axis of rotation and so that said wheels are movable with respect to each other along said common axis from a first relative collapsed position to a second relative operative position;
handle means;
means for operatively mounting said handle means to said frame mechanism so that said handle means are releasably movable with respect to said frame mechanism;
cable means operatively connecting said wheels to said handle means for effecting relative movement of said wheels toward and away from each other between said first and second positions, in response to movement of said handle means with respect to said frame mechanism; and
wherein said attaching means comprise means distinct from said cable means for holding said wheels in said first and second positions.

16. A cart as recited in claim 15 wherein said means for operatively mounting said handle means to said frame mechanism comprises a second frame mechanism and means for mounting said handle means for rotation with respect to said frame mechanism, and wherein said cable means are operatively connected to said wheels and to said second frame mechanism.

17. A cart as recited in claim 15 further comprising means for releasably attaching said cable means to said wheels so that ready adjustment of the relative position of said wheels with respect to the position of said handle means is provided.

18. A cart as recited in claim 15 wherein said means for attaching said wheels to said frame mechanism comprises a parallelogram linkage including a restraining link having an elongated slot formed therein and a pin attached to another link of said linkage received by said slot, and spring means for biasing said linkage so that said wheels are normally located a maximum distance apart along said common axis.

19. A cart for mounting an elongated bag, said cart comprising:
a frame mechanism;
means for operatively attaching said frame mechanism to a bag;
means for attaching a pair of wheels to said frame mechanism so that said wheels have a common axis of rotation and so that said wheels are movable with respect to each other along said common axis;
handle means;
means operatively mounting said handle means to said frame mechanism so that said handle means are releasably movable with respect to said frame mechanism, including a second frame mechanism and means for mounting said handle means for rotation with respect to said frame mechanism; and
cable means operatively connecting said wheels to said handle means for effecting relative movement of said wheels toward and away from each other in response to movement of said handle means with respect to said frame mechanism, said cable means being operatively connected to said wheels and to said second frame mechanism.

20. A cart as recited in claim 19 including means for mounting said second frame mechanism for only pivotal movement with respect to said frame mechanism, and means for effecting movement of said frame mechanism with respect to said second frame mechanism in response to rotational movement of said handle means with respect to said second frame mechanism.

21. A cart as recited in claim 20 wherein said means for mounting said second frame mechanism for movement with respect to said frame mechanism comprises a pair of arcuate guide bars and a pair of guide bar ways mounted on said frame mechanism for receiving said guide bars, and wherein said means for effecting movement of said frame mechanism with respect to said second frame mechanism comprises a pair of connecting rods each connected at one end thereof to said frame mechanism and at the other end thereof to said handle means at a point on said handle means offset from said means for mounting said handle means for rotation with respect to said second frame.

22. A cart as recited in claim 21 further comprising clamping means for selectively preventing or allowing movement of said guide bars with respect to said ways.

23. A cart as recited in claim 19 wherein said means for mounting said handle means to said second frame mechanism includes clamping means for allowing clamping of said handle means in any rotational position to which it has been moved with respect to said second frame mechanism.

24. A cart as recited in claim 19 wherein said cable means comprises a pair of cables, each cable operatively attached at one end thereof to a wheel, and passing through a rigid guide; and each cable attached at the other end thereof to said second frame mechanism by a cable lever, each cable lever mounted by a pivot pin to said second frame mechanism and including spring means for biasing said cable lever in one sense about said pivot pin, and said cable attached to said cable lever at a point offset from said pivot pin and for moving said cable lever about said pivot pin in the sense opposite to said one sense.

25. In combination, an elongated structurally rigid bag having an opening at one end thereof, and a handle at one side thereof adjacent the opening; and a cart; said cart comprising
    a frame mechanism;
    means for attaching a pair of wheels to said frame mechanism;
    means for attaching said frame mechanism to said bag handle so that said handle is on the opposite side of said bag from said wheels;
    a second frame mechanism having a handle operatively connected thereto; and
    means for mounting said second frame mechanism rigidly to said bag adjacent said bag opening; said means for mounting said second frame mechanism to said bag comprising a brace strap encircling said bag, and a bag clip engaging said bag at a lip of said bag opening on the opposite side of said bag from said handle.

26. A cart as recited in claims 25 or 15 wherein said frame mechanism comprises a yoke comprising metal tubing having a polygonal cross-sectional shape.

27. A cart for mounting an elongated structurally rigid bag having an opening at one end thereof, and a handle at one side thereof adjacent the opening, the cart comprising
    a frame mechanism;
    means for attaching a pair of wheels to said frame mechanism so that said wheels have a common axis of rotation and so that said wheels are movable with respect to each other along said common axis;
    means for mounting said frame mechanism to a bag at its handle, said means consisting of structures engaging the bag at its handle and between the handle and the opening; and
    handle means for pulling said frame mechanism and operatively mounted to said frame mechanism, and movable with respect to said frame mechanism to effect movement of said wheels toward and away from each other along their common axis;
    said mounting means comprising an insert having substantially the same exterior configuration as the interior configuration of the bag handle and having a pivot pin extending outwardly from the sides thereof, and releasable clasping means mounted to said frame mechanism for engaging said pivot pin to fix the position of said insert with respect to said frame mechanism while allowing relative pivotal movement therebetween.

* * * * *